Oct. 6, 1959    F. A. WINDUST    2,907,316
CAMP STOVE

Filed May 13, 1957    2 Sheets-Sheet 1

INVENTOR.
FRANK A. WINDUST
BY
Buckhorn, Cheatham & Blore
ATTORNEYS

Oct. 6, 1959   F. A. WINDUST   2,907,316
CAMP STOVE
Filed May 13, 1957   2 Sheets-Sheet 2
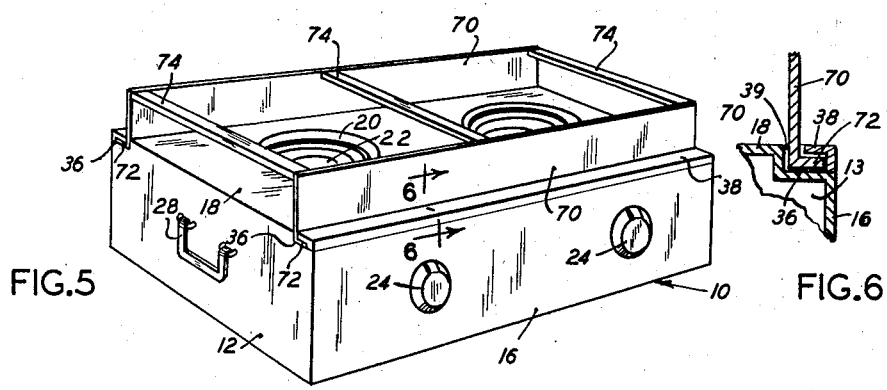
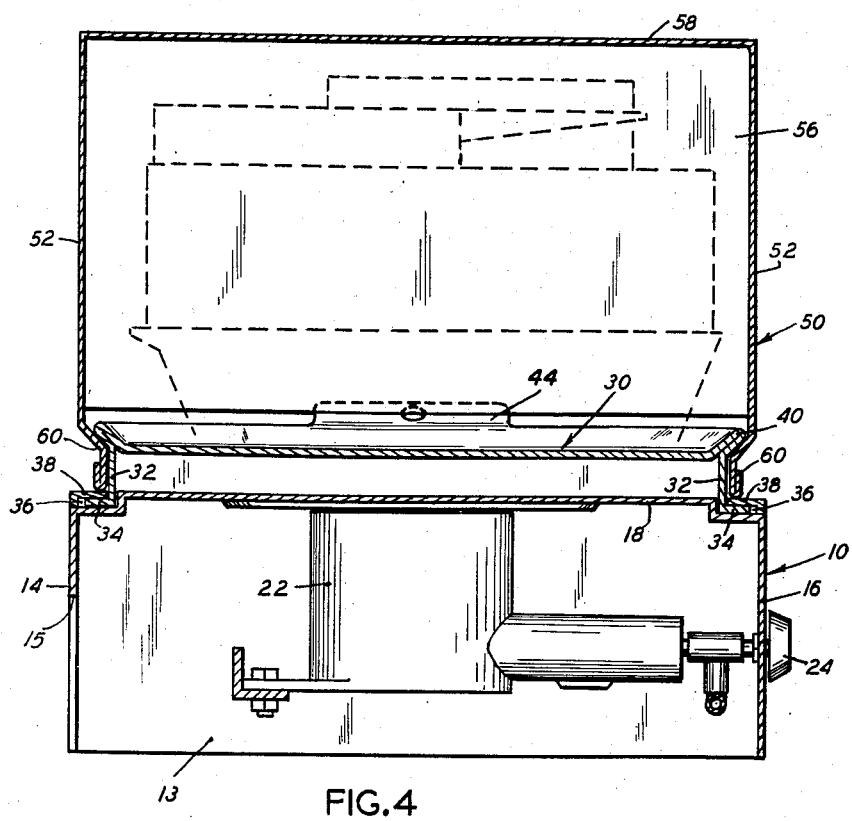
INVENTOR.
FRANK A. WINDUST
BY
Buckhorn, Cheatham & Blore
ATTORNEYS

United States Patent Office 2,907,316
Patented Oct. 6, 1959

2,907,316

CAMP STOVE

Frank A. Windust, Corbett, Oreg.

Application May 13, 1957, Serial No. 658,643

1 Claim. (Cl. 126—9)

This present invention relates to a new and improved portable fluid fuel burning stove.

The conventional portable fluid fuel burning stove, popularly known as a camp stove, used heretofore, comprises a boxlike body having a plurality of burner units mounted therein and means such as a grate for supporting individual cooking pots and pans over the individual burners. Difficulty is frequently encountered in preparing meals on such stoves because the limited area of frying pans requires several batches of food, such as bacon, to be cooked, consuming considerable time and preventing use of the burner over which the pan is located for any other purpose.

It is, therefore, an object of the invention to provide a camp stove having a griddle of large area that may be positioned over two or more burner units of a camp stove to enable more efficient use of the stove.

Since it is not always necessary that the entire griddle surface be used, it is a further object of the invention to provide a camp stove having a griddle of large area that may be positioned over two or more burners of the stove so as to heat the entire surface of the griddle, or, if desired, be partially withdrawn so as to extend over only one burner unit of the stove, thus to heat only the area above such burner unit, whereby the other burner unit or units may be used for other purposes.

Another object of the invention is to provide a camp stove having a detachable griddle that may be secured to the stove to form a compact unit when the stove is being transported.

Still another object is to provide a stove of the class described having a detachable heating oven.

A further object is to provide a stove of the class described having a griddle interchangeable with a guard to retain pots on the stove even though the stove may be tipped.

Other objects and advantages of the present invention will become more apparent hereinafter.

In accordance with the illustrated embodiment of the invention, there is provided a camp stove including a rectangular base unit having two or more burner units therein for burning a fluid fuel. The burners are positioned beneath the openings in the top plate of the base portion and a griddle is provided which may be positioned over one or more of the burners, the griddle and the base having slidably engaging portions to retain the griddle in a horizontal position and in engagement with the base when it is mounted thereon. A top portion or heating oven is provided which slidably engages with the griddle, so as to secure the top relative to the base portion whereby the base, griddle and top may be carried as a unit.

For a more detailed description of the invention reference is made to the accompanying drawings wherein:

Fig. 4 is a sectional view taken substantially along the line 4—4 of Fig. 3;

Fig. 5 is a perspective view of the base portion of the stove showing the stove with a pot guard in place of the griddle; and Fig. 6 is a fragmentary sectional view taken along line 6—6 of Fig. 5.

Figure 1:
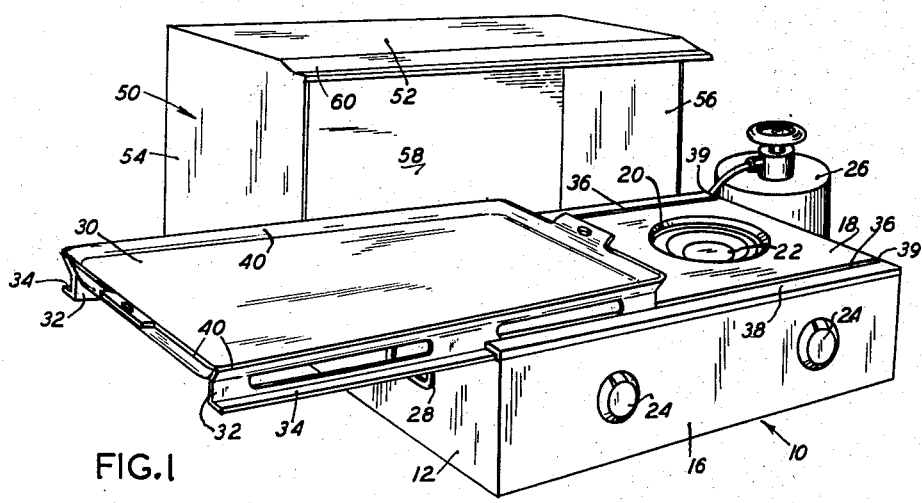
Fig. 1 is a perspective view of the stove of the invention showing it with certain parts disassembled and with the griddle in one of its operative positions.

Referring to the drawings, the stove of the invention includes a base portion 10 comprising a rectangular metal body formed of sheet metal or other suitable material and including end walls 12, 13, a back wall 14 having a vent opening 15 therein, a front wall 16 and a top wall or plate 18. The top plate 18 is provided with circular openings 20 beneath which are mounted burner units 22 which are preferably of the type for burning a fluid fuel such as butane or gasoline. Control knobs 24 are mounted on the front wall 16 of the base for controlling the burner units, which may be supplied from a suitable tank of fuel such as the tank 26 shown in Fig. 1. A handle 28 may be provided on the end wall 12 for carrying the stove.

Figure 2:
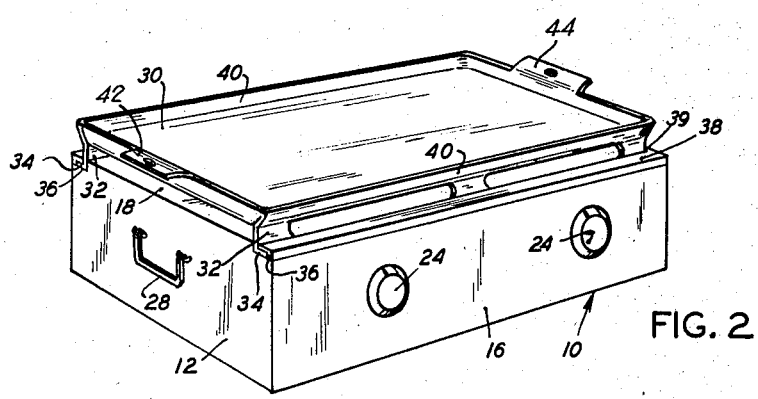
Fig. 2 is another view of the stove showing the griddle in another operative position thereof.

Slidably mounted on the top of the base portion 10 is a solid cooking griddle 30 of aluminum or other suitable material and of substantially the length of the top plate 18 so that the griddle may extend over both of the openings 20, if desired, as shown in Fig. 2. The griddle 30 is slidably supported on the base portion 10 by means of legs 32 extending along each of the opposite sides of the griddle and provided with right angularly extending flanges 34. The legs 32, 34 fit within suitably formed channels 36 in the top of the base portion along each of the opposite sides of the top plate 18, the channels 36 being defined, in part, by elements 38 which extend over the flanges 34 to prevent relative vertical movement between the griddle and the base portion. Thus, even if the griddle 30 is partially withdrawn from its position over the base portion 10, such as to the position shown in Fig. 1, the griddle will be retained in its horizontal position and will not tip. The channels 36 are open at one end, the left end as the stove is shown in Fig. 1, but a suitable stop 39 is provided in the opposite end of each channel to prevent the griddle from being removed from that end for a reason to be explained hereinafter.

The griddle 30 is provided with upstanding lips 40 around its periphery which, along each of the opposite sides of the griddle, are bent outwardly, as best shown in Fig. 4. The griddle is also provided with handles 42, 44 at the opposite ends thereof, one of which, the handle 42 as illustrated, extends substantially horizontally from the edge of the lip 40 for a purpose to be described. The lips 40 have a twofold purpose, one being to retain on the griddle grease or oil for foods which may be cooking thereon, the other being to secure to the griddle an oven or top portion 50, which will now be described.

Figure 3:
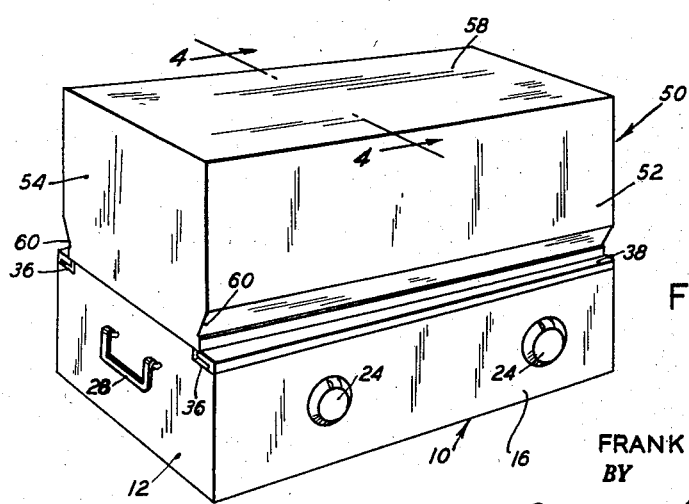
Fig. 3 is a perspective view of the stove showing it assembled for use as a tent heater and as it is assembled for transportation.

The top portion 50 of the stove comprises a rectangular boxlike structure including side walls 52, end walls 54, 56, and a top wall 58. The lower marginal edges 60 of the side walls 52 are bent inwardly so as to engage beneath the lips 40 of the griddle, as best shown in Fig. 4, with the lower edge of the side wall 52 engaging the top of the base portion 10. The end wall 56 is cut away, as shown in Fig. 1, so that the top portion may slide over the griddle 30 from the left side of the base portion 10, as indicated in Figs. 3 and 4. As mentioned previously, the handle 42 projects substantially horizontally from the edge of the lip 40, the purpose for this construction being so that the end wall 56 will clear the handle 42 as the top portion 50 is mounted upon the stove. The edge of the opposite end wall 54 is, on the other hand, even with the lower edges of the sidewalls 52, so that the end wall 54 engages the griddle 30 when the top is over the griddle, thus to prevent further movement of the top portion toward the right end of the stove, again for a purpose to be explained.

When the stove of the invention is to be transported, it is assembled with the griddle 30 engaged on the base portion 10 and with the top portion 50 in position over the griddle, as shown in Figs. 3 and 4. If desired, the space between the griddle 30 and the top portion 50 may be used for storing pots and pans, dishes or food supplies, and the like. The stove may be carried on end with one hand by the handle 28. Because of the position of the stops 39, the griddle 30 is held within the channels 36, and the top portion likewise is held in the position shown in Fig. 3, because of the engagement of the end wall 54 with the griddle 30.

When the stove is to be used for cooking, the top portion 50 is removed along with any materials carried therein, and thereafter the griddle 30 is positioned either fully over the base portion 10, as shown in Fig. 2, in the event that it is desired to use the entire surface thereof for cooking, or alternatively it may be withdrawn partially, as shown in Fig. 1, exposing one of the openings 20 over which it may be desired to place a pot for heating water or for cooking. Of course, the griddle 30 may be entirely removed if it is desired to use both of the openings 20. The top portion 50 may be positioned beside the stove, as shown in Fig. 1, to serve as a windbreak and as a reflecting surface. Furthermore, the top portion 50 may also be used as a radiating surface if it is desired to use the stove for a heater in a tent, in which case the top portion is positioned on the base 10, as shown in Figs. 3 and 4. In such position, the top portion 50 serves as protection against direct contact with the griddle 30 or the flame of the burner. The heat from the burners 22 will, of course, be distributed over the relatively large area of the top portion 50 so that the temperature of the exposed surface will not be so high as to burn the skin if it is accidentally touched, an important consideration when in the close confines of a tent or boat cabin.

The top portion 50 may also be used as a dishpan or washpan, or the like.

As an accessory to the stove of the invention, there may be provided a guard or rack to hold pans upon the stove when the griddle is not in use. Such a rack is particularly desirable when the stove is to be used on boats or in trailers, and the like, where the stove is likely to be tipped because of the motion of the boat or trailer. Illustrated in Figs. 5 and 6 is such a rack, which includes a pair of elongate side members 70 formed with flanges 72 along their lower edges so that the side members may be inserted in the channels 36 of the base portion 10. Extending between the side members 70 at each of the opposite ends thereof and in the center are cross braces 74. Should the stove be tilted when a pan is thereupon, the side members 70 or the cross braces 74 will engage the pan to prevent it from sliding off the stove.

Having illustrated and described a preferred embodiment of the invention, it should be understood that the invention is susceptible to modification in whole and in part. I claim as my invention all such modifications as come within the true spirit and scope of the appended claim.

I claim:

A portable camp stove comprising a base portion having an elongate, rectangular top plate provided with a pair of cooking pot receiving openings spaced apart lengthwise of said plate, a burner unit in said base portion beneath each of said openings, a cooking griddle of a length sufficient to extend over both of said openings slidably mounted over said top plate for movement in a direction lengthwise of said plate, cooperative interengaging means on said base portion and said griddle to prevent vertical movement of said griddle relative to said base portion, said means comprising a dependent leg on each of the opposite sides of said griddle, each of said legs having a right angularly extending flange along the lower edge thereof, means on said base portion defining channels extending along the opposite sides of said top plate for receiving said legs, said last mentioned means comprising elements extending over each of said flanges to prevent upward movement thereof, said griddle having upwardly and outwardly extending lips along each of the opposite sides thereof, and a top portion slidably mounted over said base portion and including pairs of opposite side walls, and a top wall, the lower marginal edge portion of a pair of said side walls being turned inwardly and slidably engaging beneath said griddle lips so as to secure said top portion to said griddle and to prevent vertical movement of said top portion relative to said griddle, the lower edges of said side walls engaging the top of said base portion.

References Cited in the file of this patent

UNITED STATES PATENTS

| | | |
|---|---|---|
| 6,499 | Brown | June 5, 1849 |
| 158,028 | Case | Dec. 22, 1874 |
| 168,084 | Comstock | Sept. 28, 1875 |
| 360,372 | Calone et al. | Mar. 29, 1887 |
| 697,506 | McCulloch | Apr. 15, 1902 |
| 778,683 | Kulp | Dec. 27, 1904 |
| 874,295 | Brand | Dec. 17, 1907 |
| 968,441 | Ayer | Aug. 23, 1910 |
| 1,340,615 | Lawa | May 18, 1920 |
| 1,370,113 | Janusonis | Mar. 1, 1921 |
| 1,530,110 | Curtiss | Mar. 17, 1925 |
| 1,622,180 | Colbourne | Mar. 22, 1927 |
| 2,011,125 | Small | Aug. 13, 1935 |
| 2,512,223 | Contiguglia | June 20, 1950 |
| 2,565,694 | Little | Aug. 28, 1951 |
| 2,596,329 | Egbert | May 13, 1952 |
| 2,764,080 | Knapp | Sept. 25, 1956 |